Sept. 23, 1947.    W. VUTZ    2,427,824
POWER TRANSMISSION SHAFTING AND SUPPORT THEREFOR
Filed July 23, 1943    3 Sheets-Sheet 1
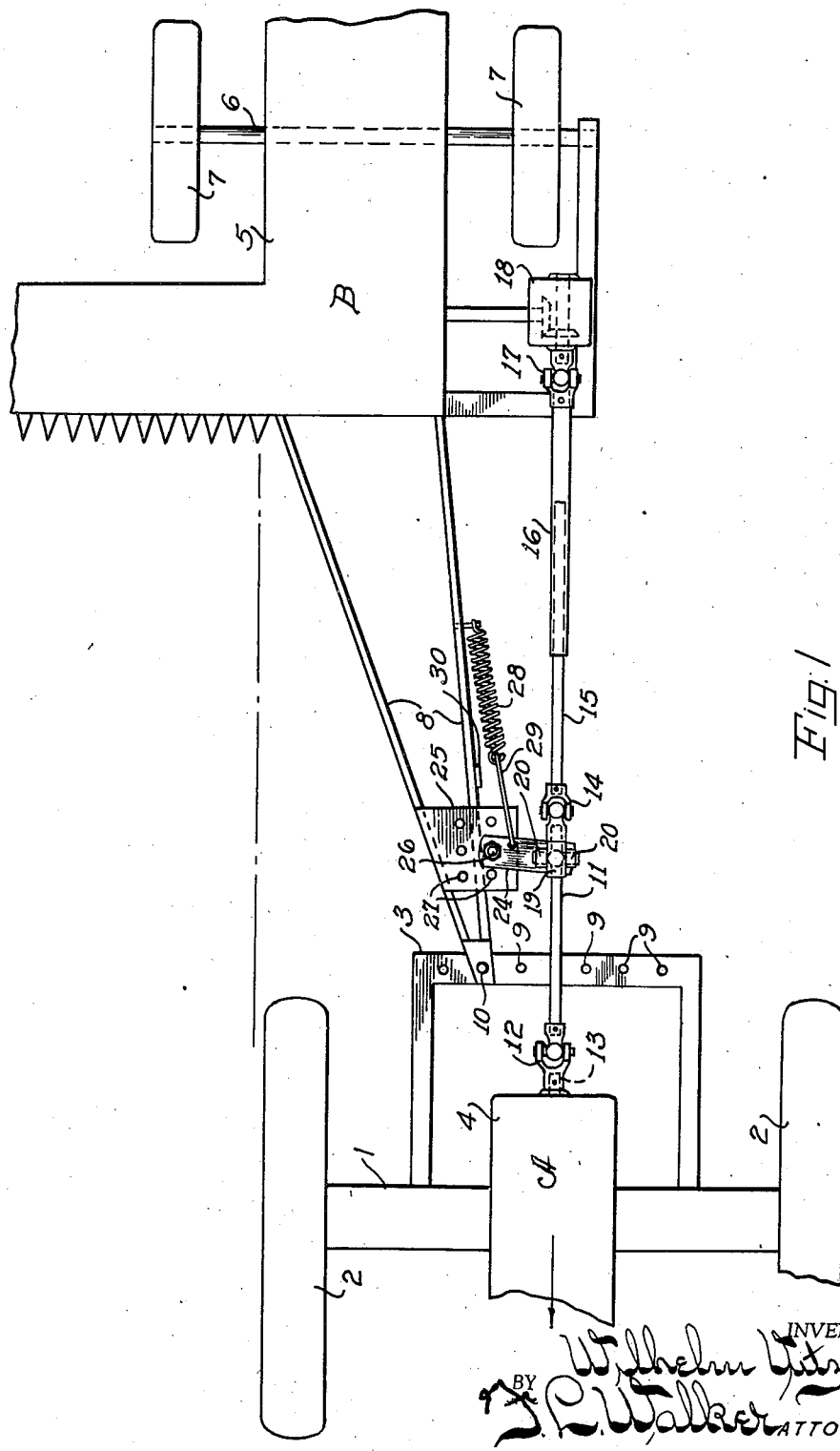

Sept. 23, 1947. W. VUTZ 2,427,824
POWER TRANSMISSION SHAFTING AND SUPPORT THEREFOR
Filed July 23, 1943 3 Sheets-Sheet 2
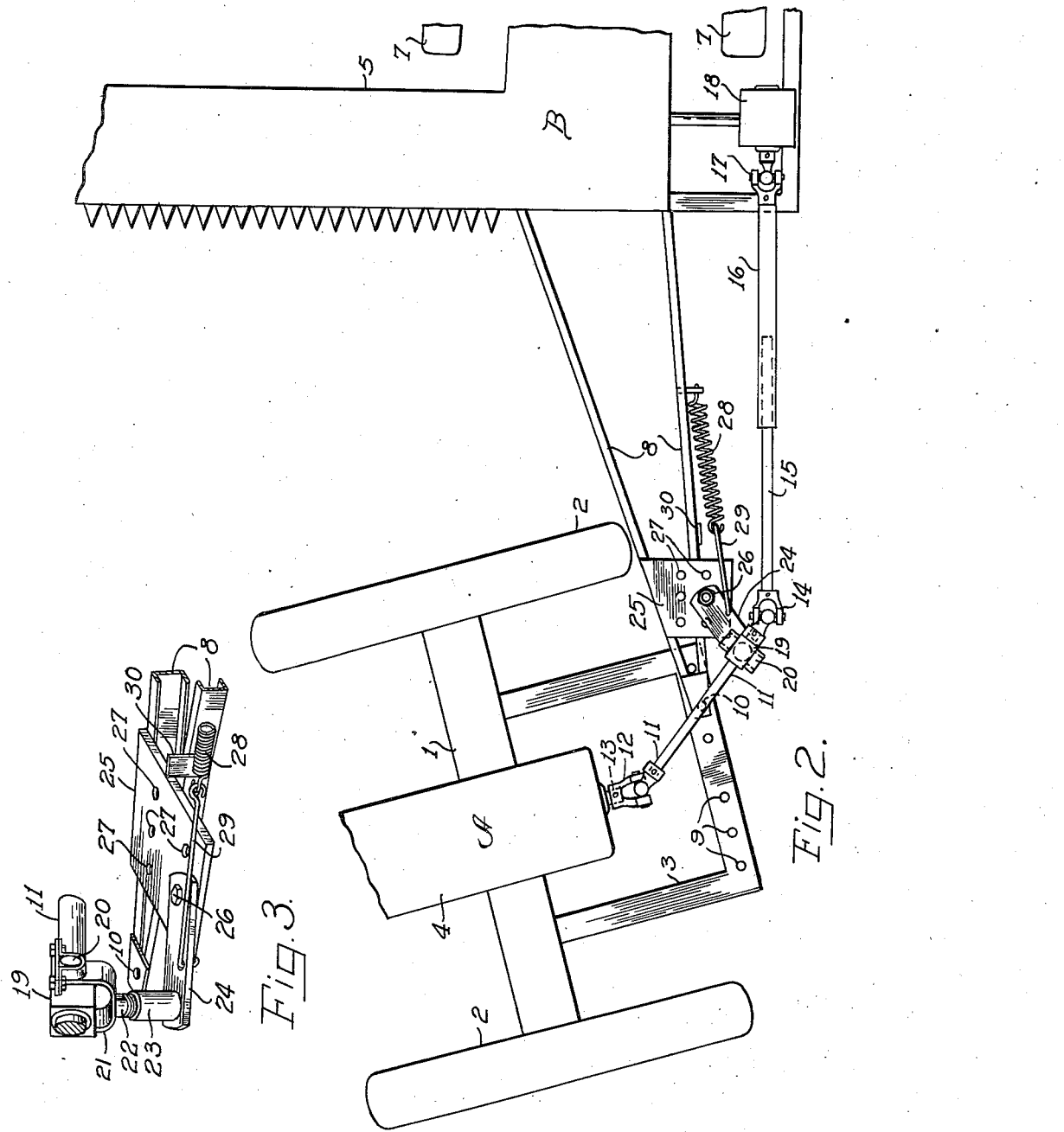

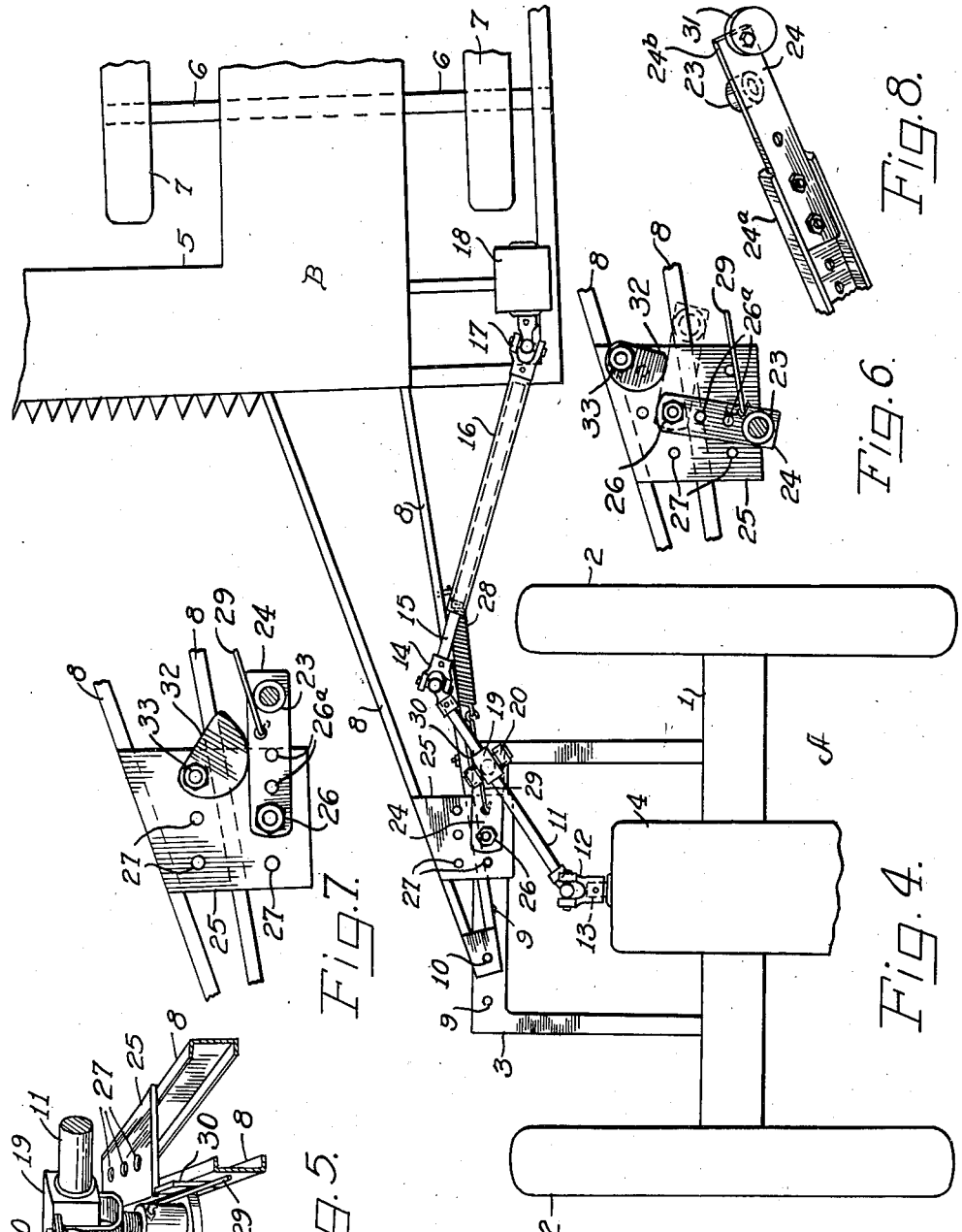

Patented Sept. 23, 1947

2,427,824

UNITED STATES PATENT OFFICE 2,427,824

POWER TRANSMISSION SHAFTING AND SUPPORT THEREFOR

Wilhelm Vutz, Coldwater, Ohio, assignor, by mesne assignments, to Avco Manufacturing Corporation, a corporation of Delaware Application July 23, 1943, Serial No. 495,854

23 Claims. (Cl. 180—14)

This invention pertains to power transmission mechanisms for tractor drawn land vehicles, and more particularly to an automatically compensating power coupling maintaining driving connection of a trailer unit mechanism with a tractor power unit in various positions of misalignment thereof and while making relatively short turns in their path of travel.

For illustrative purpose, but with no intent to unduly limit the scope or application of the invention, it is here shown and described as applied to agricultural implements, but it is to be understood that it is not limited to such use.

Operation of tractor drawn farm implements, combines, mowers, cultivators, planters and the like, necessitates more or less frequent turns on relatively short radii, some of which approximate right angle to the direction of a preceding path of travel. Also, for certain operations it is necessary that the implement be laterally offset in one direction or the other relative to the fore and aft axis of the tractor unit to align a planter, or a cultivating or harvesting implement with plant rows while the tractor unit follows a path intermediate such rows.

While operative under ordinary conditions, existing power take-off devices do not afford the flexibility or range of adjustment requisite for present practice, and necessitate use of special hitches, added power shafts, and manual adjustments.

The object of the present invention is to improve the structure as well as the means and mode of operation of automatically adjustable power transmission devices or power take-offs for trailer vehicles and the like, whereby they may not only be economically manufactured, but will be more efficient in use, automatic in operation, uniform in action, having relatively few operating parts and be unlikely to get out of repair.

A further object of the invention is to provide a power take-off device having a wide range of universal adjustment and adaptability to power units or tractors of different manufacture and design and to driven implements or mechanisms of different character.

A further object of the invention is to provide a power take-off device which will readily accommodate itself to different degrees of lateral unalignment of the driving and driven units, in either direction, without the necessity of special hitches or adjustments.

A further object of the invention is to provide a power transmission mechanism which will automatically compensate for deviations from a direct path of travel, and turns of different radii including approximately right angle turns, and will maintain approximately uniform transmission of power throughout such changes of direction.

A further object of the invention is to increase the operating range of such compensating power drive mechanism without interfering with the normal operation of either the driving or driven unit.

A further object of the invention is to provide an automatically compensating power take-off device for interconnecting tractor and trailer implements or vehicles, having the advantageous structural features and inherent meritorious characteristics and mode of operation herein set forth.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawings.

In the accompanying drawings, wherein the invention is illustrated in its preferred but not necessarily its only form of embodiment, Fig. 1 is a plan view of fragmentary portions of a tractor unit and a trailer unit interconnected by an automatically compensating power transmission mechanism embodying the present invention.

Fig. 2 is a plan view of the assembly shown in Fig. 1 with the parts in positions assumed while making a right hand turn.

Fig. 3 is a perspective view of the trailer hitch and power transmission mechanism partly broken away, with the parts in the approximate relation shown in Fig. 2.

Fig. 4 is a plan view of the assembly shown in Figs. 1 and 2, with the parts in their relative positions while making a right angle, left hand turn.

Fig. 5 is a further perspective view of the hitch and power transmission devices in approximately the position shown in Fig. 4.

Figs. 6, 7 and 8 are detail views of modifications of the adjustable shaft support carrier and variable stop means therefor.

Like parts are indicated by similar characters of reference throughout the several views.

Referring to the drawings, A indicates the tractor or driving unit, while B identifies the drawn implement or trailing unit, to which operating power is transmitted from the tractor. In this instance a mower, a harvester, or combine is shown, to the operating parts of which power is transmitted by the intermediate mechanism forming the subject matter hereof.

The portion of the tractor A illustrated includes the rear axle 1, upon which are mounted the rear driving wheels 2, beyond which the customary draw bar 3 extends rearwardly for connection of the drawn implement or unit B. On the tractor is the rear portion of the motor housing 4.

The drawn implement B, to which power is transmitted from the tractor unit, includes a main frame or body portion 5 supported on an axle 6, on which are mounted carrying wheels 7. A draft tongue 8 rigidly connected to the implement B extends forwardly thereof with its extremity pivotally connected to the draw bar 3 of the tractor by a removable coupling pin 10 engageable in any one of the holes 9 in the draw bar.

Projecting from the rear end of the motor housing 4 of the tractor is a revoluble power shaft 13, which is connected for unison rotation by a universal joint 12 with the initial section 11 of a jointed, telescopic transmission shaft. The rearward end of the initial transmission shaft section is coupled by a second universal joint 14 with the member 15 of a telescopic shaft couple 15—16. The members 15 and 16 are splined or keyed together for unison rotation, but are capable of relative axial movement. In lieu thereof the shaft 15 may be polygonal and have sliding engagement in a polygonal tubular shaft 16. The telescopic member 16 is, in turn, interconnected by a further universal joint 17 with the power driven mechanism of the unit B, the initial portions of which are within the housing 18 on the trailing unit.

Intermediate its terminal connections with the tractor drive shaft 13 and the telescopic shaft member 15, the initial section 11 of the jointed power transmission shaft is mounted for both revoluble and reciprocatory motion within a bearing block 19. The bearing block 19 is supported in a gimbal type mounting for oscillatory motion about both vertical and horizontal axes. The block 19 is provided with trunnions 20 disposed transversely of the shaft 11, which are journaled in the bifurcated or forked end of a vertical supporting standard 21. The stem 22 of the standard 21 is screw threaded into a boss 23 disposed upright upon the free end of a swinging arm 24. The oscillatory arm 24 is pivotally engageable in any one of several positions, with a plate 25 fixedly mounted on the draft tongue 8 of the trailer unit B.

The bearing block 19 thereby provides a planetary type support for the drive shaft, it being pivotally supported upon the oscillatory arm 24 which arm is pivotally mounted upon the plate 25, the mounting stud 26 acting as a solar pivot for the supporting assembly. The plate 25 is provided with holes 27, in any one of which the pivotal stud 26 of the swinging arm 24 is optionally engageable. Connected to the swinging arm 24 by a link 29 is a helical retractile spring 28, the opposite end of which is engaged with the draft tongue 8 of the trailer implement B.

The construction thus described affords a maximum degree of flexibility and adjustability by which changing relation of the tractor A and drawn implement B is readily and automatically accommodated as they relatively rise and fall when passing over uneven ground, and as the points of attachment of the transmission shaft with the respective units separate and recede as the units follow deviating courses and turn to the right or to the left. The trunnion bearings 20 of the bearing block 19 enable the power shaft and its connections to rock vertically as the units A and B traverse uneven ground or changing levels. To and fro horizontal oscillation of the power shaft, enabled by pivotal motion of the arm 24, and the mounting standard 21 accommodates necessary adjustment of the parts as occurs upon lateral deviation of the courses of the respective units as naturally occurs, even on a straight away path of travel, and especially when making turns or reversing the direction of travel. The retractile spring 28 is effective to return the swinging arm 24 to its normal position, shown in Fig. 1, from which it is moved by engagement of the base of the universal joint 14 with the bearing block 19 while making a right hand turn as shown in Fig. 2. The spring 28 further functions to retract the swinging arm 24 and bearing block 19 rearwardly from the position shown in Fig. 1 to that in which they appear in Fig. 4 when making a left hand turn. In the latter position the arm 24 assumes a position approximately parallel with the draft tongue 8 in which it is arrested by engagement with a stop 30 on the draft tongue. The stop 30 is preferably, although not necessarily, adjustable upon the draft tongue 8, to vary the range of oscillation of the arm 24.

To adapt the power transmission to tractors A having drive shafts 13 at different heights, the stem 22 of the upright bifurcated supporting standard 21 may be screwed into or out of the threaded boss 23 to greater or less extent, thus raising or lowering the initial shaft section 11, without restricting its axial adjustment to and fro through the bearing block 19, nor its rocking movement as the vehicles travel over uneven ground, nor its lateral swinging motion as the vehicles turn toward the right or left. The optional selection of any one of the holes 9 of the tractor draw bar 4 enables the trailing vehicle to be accommodated to different tractors and affords different degrees of lateral unalignment of the drawn unit relative to the path of travel of the tractor. Likewise, the adjustability of the pivotal point of the swinging arm 24 to agree with any one of the holes 27 in the plate 25 enables the device to be adapted to a wide range of conditions of use. In lieu of shifting the pivotal point of the arm 24, the latter may be made extensible and contractible to accomplish a similar purpose.

Such construction is shown in Fig. 8, wherein the movable support carrier comprises two longitudinally adjustable sections 24a and 24b bolted together in either one of several positions of relative adjustment, to extend and contract the carrier arm 24 and so vary the radius of the arcuate range of the movable shaft support carried thereby.

As an alternative construction, shown in Fig. 6, the swinging arm 24 may be provided with a series of holes 26a, in any one of which the pivotal stud 26 may be engaged to lengthen or reduce the radius of the swinging arm 24. By differentially selecting a pivotal hole 26a and likewise selecting one or another of the holes 27 in the plate 25 as the pivotal point of the arm 24, the field of operation of the latter may be quite widely varied.

To limit the range of shifting motion of the shaft support, in lieu of adjusting the stop 30 longitudinally of the stub tongue 8 an eccentric stop 31, pivoted to the underside of the arm 24 as in Fig. 8, may be secured in any selected position of revoluble adjustment for contact with the tongue 8 or other convenient portion of the structure, after greater or less movement of the carrier arm.

In Fig. 7 is shown a variation of the arrangement described above relative to Fig. 6, wherein the eccentric stop 32 may be pivotally engaged in any one of the holes 27 of the plate 25 and secured by tightening the pivotal stud 33, or by shifting the latter to a different position 27, the support carrier 24 may be permitted a greater or less range of movement.

For convenience of illustration, but with no intent to so limit the invention, the shaft support has been shown mounted upon the draft tongue of the trailer unit intermediate the driving and driven mechanisms. It might be made a component part of either the driving or the driven mechanism or mounted elsewhere upon either the tractor or trailer unit, or upon a bracket or extension of such mechanisms or units other than the interconnecting draft tongue.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. A power transmission assembly interconnecting the power shaft of a tractor unit with the drive shaft of a mechanism mounted on a trailer unit flexibly coupled to the tractor unit, said units being subject to fluctuating degree of unalignment one relative to the other incident to their travel movement, including a flexible shaft assembly comprising a pair of telescopically adjustable shaft members, a universal joint connecting one of the telescopic members with the shaft of one of the units, a rigid shaft section, a second universal joint connecting one end of the rigid shaft section with the other member of the telescopic shaft members, a third universal joint interconnecting the other end of the rigid shaft section with the shaft of the other unit, a medial support for the flexible shaft assembly pivotally mounted on one of the intercoupled units for lateral swinging motion relative thereto, relative to which support one section of the flexible shaft is capable of both oscillatory and reciprocatory motion.

2. A power transmission assembly interconnecting a power shaft of a tractor unit with a driven shaft upon a trailer unit flexibly coupled to the tractor for unison travel movement in varying degree of unalignment, including a telescopic shaft section and a rigid continuing shaft section, universal joints connecting the rigid shaft section and one member of the telescopic shaft section end to end, and connecting the other member of the telescopic shaft section and other end of the rigid shaft section with the power and driven shafts of the respective units, a medial support for the shaft assembly carried by one of the intercoupled units yieldingly mounted for to and fro shifting movement, and a retractile spring against the yielding resistance of which the support is automatically moved in one direction and under influence of which it is shifted in the opposite direction.

3. A power transmission assembly interconnecting a power shaft of a tractor unit with a driven shaft upon a trailer unit flexibly coupled to the tractor for fluctuating degree of unaligned travel incident to their unison advancement, including a universally jointed shaft assembly, comprising a rigid section and a telescopic section, and a universal joint interconnecting said rigid and telescopic sections one to the other, universal joints connecting the extreme ends of the rigid and telescopic sections with the power shaft and driven shaft of the intercoupled units, and a medial support for the shaft assembly pivotally mounted on one of the units for lateral swinging motion thereto, relative to which support at least one section of the shaft assembly is capable of to and fro oscillatory and longitudinal reciprocatory movements.

4. A power transmission assembly interconnecting a power shaft of a tractor unit with a driven shaft upon a trailer unit flexibly coupled to the tractor for fluctuating degree of unaligned travel incident to their unison advancement, including a medially, universally jointed shaft assembly, one section of which is extensible and contractible and the other section of which is rigid, universal joints connecting the extreme ends of the rigid and extensible and contractible sections with the power shaft and driven shaft of the intercoupled units, a swinging arm carried by one of the units, and a support for the shaft assembly carried by the arm relative to which the shaft assembly is capable of oscillatory and reciprocatory motions.

5. A power transmission assembly interconnecting a power shaft of a tractor unit with a driven shaft upon a trailer unit flexibly coupled to the tractor for fluctuating degree of unaligned travel incident to their unison advancement, including a medially, universally jointed shaft assembly, one section of which is extensible and contractible and the other section of which is rigid, universal joints connecting the extreme ends of the rigid and extensible and contractible sections with the power shaft and driven shaft of the intercoupled units, a medial support for the shaft assembly pivotally carried by one of the units for lateral swinging motion relative thereto, relative to which support the shaft assembly is capable of oscillatory and reciprocatory motions and means for automatically swinging the support into various positions of lateral adjustment in accordance with variations in alignment of the shaft assembly.

6. A power transmission assembly interconnecting a power shaft of a tractor unit with a driven shaft upon a trailer unit flexibly coupled to the tractor for fluctuating degree of unaligned travel incident to their unison advancement, including a medially, universally jointed shaft assembly, one section of which is extensible and contractible and the other section of which is rigid, universal joints connecting the extreme ends of the rigid and extensible and contractible sections with the power shaft and driven shaft of the intercoupled units, a bifurcated standard in which one section of the shaft assembly is mounted for relative oscillatory and reciprocatory motions, a laterally movable support for the standard carried by one of the units, and a vertically adjustable connection between the support and standard by which the latter may be raised and lowered to accommodate the shaft assembly to differently related units.

7. A transmission mechanism for transmitting power from a tractor to driven mechanism on a trailing unit drawn by the tractor, including a jointed telescopic shaft comprising a revoluble shaft section universally coupled with a drive shaft of the tractor, a telescopic revoluble shaft with one member of which the aforementioned shaft section is universally coupled, the other member of which is universally coupled with a driven mechanism on the drawn unit, a support for one of the shaft members pivotally mounted on the trailing unit for lateral swinging motion relative thereto, upon which support the shaft member is capable of alternate reciprocatory motion, vertical rocking motion and lateral swinging motion simultaneously with its rotation, and means for automatically swinging said support about its pivot in accordance with variations in alignment of the shaft sections.

8. A power transmission mechanism for transmitting rotary motion from a driving unit to a driven unit carried upon relatively movable supports capable of alternating motion into and out of aligned relation, comprising a rotary telescopic shaft section, a continuing rotary shaft section, a universal coupling connecting the continuing shaft section to one member of the telescopic shaft, additional universal joints connecting the terminals of the shaft assembly to the driving and driven units, and a fulcrum carried by one of the supports and movable through an arcuate path of travel upon which one of the shaft sections is mounted for oscillatory motion about transverse axes and relative to which the said shaft section is slidingly movable in an axial direction, the oscillatory motions and axial sliding motion of the shaft section being effected simultaneously with its rotation, the construction and arrangement being such that the fulcrum is automatically moved through its arcuate path of travel in response to variations in alignment of the shaft sections.

9. A power transmission mechanism connecting the power shaft of a tractor unit with operating mechanism on a trailer unit flexibly coupled to the tractor unit, the tractor and drawn units being subject to fluctuating degree of unalignment one relative to the other incident to travel movement thereof, including a jointed telescopic shaft flexibly connected with the power shaft of the tractor and with the operating mechanism on the drawn vehicle, and a medial support therefor carried on one of the said units and automatically movable to and fro in accordance with certain of the gyrations of the power shaft sections and relative to which the shaft is capable of reciprocatory adjustment and wobble motion in various positions of axial adjustment, a spring influencing certain movements of the support, and an adjustable stop for limiting the range of automatic movement of the support.

10. An assembly wherein an operating mechanism mounted on a trailer unit is driven from a tractor unit, to which the trailer vehicle is flexibly coupled for varying degree of unaligned unison travel motion, including a power transmission shaft comprising series connected revoluble shaft sections, at least one of which is extensible and contractible, the sections being universally connected with each other and with driving and driven members upon the tractor and trailing vehicle, a planetary type support for the power transmission shaft its solar pivot being carried by one of the units, and means for automatically adjusting the support in accordance with fluctuations of the power transmission shaft incident to variations in alignment of the tractor and trailer units.

11. An assembly comprising a tractor unit, including a driving member, a trailer unit flexibly coupled to the tractor unit for varying degree of to and fro unaligned unison travel motion, including a driven member associated with operating mechanism on said trailer unit, and an intermediate power transmission shaft including a rigid shaft section and a telescopic shaft section, universal joints connecting the rigid and telescopic shaft sections end to end with the tractor driving member and trailer driven member, and a support for the jointed shaft pivotally carried by one of the intercoupled units for lateral swinging motion through an arcuate path of travel in which one of the shaft sections is slidingly engaged and relative to which the shaft section is capable of rotary, reciprocatory and oscillatory motions.

12. A flexible power transmission shaft interconnecting driving and driven members carried upon relatively movable supports which supports are subject to fluctuating degrees of unalignment, including a rigid revoluble shaft section and a telescopic shaft section, universal joints interconnecting the rigid and telescopic shaft sections with each other and with the driving and driven members, a medial vertically adjustable bearing intermediate the driving and driven members in which one of the shaft sections is mounted for rotary and reciprocatory movement, and a support for said bearing pivotally mounted upon one of the supports for horizontal swinging motion through an arcuate path of travel.

13. A flexible power transmission shaft interconnecting driving and driven members carried upon relatively movable supports which supports are subject to fluctuating degrees of unalignment with each other, including a rigid rotary shaft section, a rotary extensible and contractible shaft section, universal joints interconnecting the rigid shaft section and the extensible and contractible section end to end with each other and their terminals with the driving and driven members, a medial bearing in which the flexible shaft assembly is mounted for rotary and reciprocatory motion, a shiftable support for the bearing carried by one of the supports and relative to which the flexible shaft is capable of vertical and lateral oscillatory motion, a spring against the influence of which the shiftable support is movable in one direction and under the influence of which the support is movable in a reverse direction, and an adjustable stop for limiting the range of movement of the bearing support.

14. A flexible power transmission shaft interconnecting driving and driven members carried upon relatively movable supports which supports are subject to fluctuating degrees of unalignment with each other, including a rigid rotary shaft section, a rotary extensible and contractible shaft section, universal joints interconnecting the rigid shaft section and the extensible and contractible section end to end with each other and their terminals with the driving and driven members, a medial supporting bearing in which one of the shaft sections is revoluble and axially movable, a swinging support therefor on one of said members, a variable pivotal connection for the support enabling the field of operation of the swinging support to be bodily shifted, and a stop for limiting the range of swinging movement thereof.

15. A flexible power transmission shaft interconnecting driving and driven members carried upon relatively movable supports which supports are subject to fluctuating degrees of unalignment with each other, including a rigid rotary shaft section, a rotary extensible and contractible shaft section, universal joints interconnecting the rigid shaft section and the extensible and contractible section end to end with each other and their terminals with the driving and driven members, a medial supporting bearing in which one of the shaft sections is revoluble and axially adjustable, a swinging support for the bearing carried by one of said supports, and a variable, pivotal connection for the support, by which the radius of operation of the swinging support may be changed at will.

16. A flexible power transmission shaft interconnecting driving and driven members carried upon relatively movable supports which supports are subject to fluctuating degrees of unalignment with each other, including a rigid rotary shaft section, a rotary extensible and contractible shaft section, universal joints interconnecting the rigid shaft section and the extensible and contractible section end to end with each other and their terminals with the driving and driven members, a medial bearing in which one of the shaft sections is revoluble and axially adjustable, a shiftable support for said bearing carried by one of said supports and automatically adjustable in accordance with changing degrees of unalignment of the driving and driven members, and an adjustable stop for limiting the range of adjustment of the bearing support.

17. A flexible power transmission shaft interconnecting driving and driven members carried upon relatively movable supports which supports are subject to fluctuating degrees of unalignment with each other, including a rigid rotary shaft section, a rotary extensible and contractible shaft section, universal joints interconnecting the rigid shaft section and the extensible and contractible section end to end with each other and their terminals with the driving and driven members, a supporting bearing in which one section of the flexible shaft is mounted for rotary and axially adjustment movement, and a carrier for said bearing on one of said supports, said carrier being automatically movable to and fro in accordance with changed relations of unalignment of the driving and driven members.

18. A flexible power transmission shaft interconnecting spaced units which are subject to fluctuating degrees of unalignment with each other, including a rigid rotary shaft section, a rotary extensible and contractible shaft section, universal joints interconnecting the rigid shaft section and the extensible and contractible section end to end with each other and their terminals with the spaced units, a movable support for one of the shaft sections carried by one of said units relative to which support the shaft section is axially movable and capable of to and fro oscillatory motion relative to the support in different positions of axial adjustment, a swinging extensible and contractible carrier for the movable support, by adjustment of which the radius of operation of the movable support may be varied, and a stop member limiting the range of movement of the support.

19. A flexible power transmission shaft interconnecting spaced units which are subject to fluctuating degrees of unalignment with each other, including a rigid rotary shaft section, a rotary extensible and contractible shaft section, universal joints interconnecting the rigid shaft section and the extensible and contractible section end to end with each other and their terminals with the spaced units, a movable support for one of the shaft sections carried by one of said units relative to which the shaft section is axially movable and capable of to and fro oscillatory motion relative to the support in different positions of axial adjustment, a spring controlled movable carrier for the support, a control spring therefor, and an adjustable stop limiting the range of movement of the carrier and support.

20. In an assembly of spaced units flexibly coupled to enable fluctuating degrees of unalignment thereof, a jointed extensible and retractible revoluble power shaft flexibly interconnected with the units, a medial bearing therefor intermediate units, in which a part of the jointed revoluble shaft is slidingly fulcrumed, relative to which the power shaft is capable of relative reciprocatory and wobble movements automatically under influence of changing unaligned relation of the units and a support for said bearing pivotally mounted upon one of said units for lateral swinging movement relative thereto, the construction and arrangement being such that the bearing has a planetary motion about the pivotal mounting on said unit.

21. A flexible power transmission connection wherein a pair of universally interconnected revoluble shafts, one of which is telescopic, are universally connected with spaced units relatively movable into and out of aligned relation with each other, including an arm pivotally mounted on one of said units for oscillation in a horizontal plane, a bearing sleeve within which one of the shafts is revoluble and longitudinally slidable pivotally mounted on the oscillatory arm for rocking motion about transverse axes respectively parallel with and perpendicular to the horizontal plane of oscillation of the arm, and a retracting spring for the arm.

22. A flexible power transmission connection wherein a pair of universally interconnected revoluble shafts, one of which is telescopic, are universally connected with spaced units relatively movable into and out of aligned relation with each other, including an adjustable pivotally mounted oscillatory arm carried by one of said units, a bearing sleeve within which one of the shafts is both slidable and revoluble universally mounted on the oscillatory arm for to and fro rocking motion in transverse planes, an adjustable stop for the oscillatory arm, a common mount to the oscillatory arm and the stop, said arm and stop being independently engageable with the mount in any two of a plurality of predetermined points.

23. A flexible power transmission connection wherein a pair of universally interconnected revoluble shafts, one of which is telescopic, are universally connected with spaced units relatively movable into and out of aligned relation with each other, including an adjustable pivotally mounted oscillatory arm carried by one of said units, a bearing sleeve in which one of the shafts is capable of revoluble and sliding motion, mounted on the arm for universal rocking motion said arm being automatically movable to and fro in accordance with the unalignment of the units.

WILHELM VUTZ.

REFERENCES CITED

The following references are of record in the file of this patent:

UNITED STATES PATENTS

| Number | Name | Date |
|---|---|---|
| 1,749,274 | Crisler | Mar. 4, 1930 |
| 1,906,606 | Hyman | May 2, 1933 |
| 1,827,070 | Coultas et al. | Oct. 13, 1931 |
| 1,889,600 | Hansen | Nov. 29, 1932 |
| 2,252,610 | Behl | Aug. 12, 1941 |